(12) United States Patent
de Rooij et al.

(10) Patent No.: US 10,862,337 B2
(45) Date of Patent: Dec. 8, 2020

(54) LARGE AREA SCALABLE HIGHLY RESONANT WIRELESS POWER COIL

(71) Applicant: Efficient Power Conversion Corporation, Ei Segundo, CA (US)

(72) Inventors: Michael A. de Rooij, Playa Vista, CA (US); Yuanzhe Zhang, Torrance, CA (US)

(73) Assignee: Efficient Power Conversion Corporation, El Segundo, CA (US)

( * ) Notice: Subject to any disclaimer, the term of this patent is extended or adjusted under 35 U.S.C. 154(b) by 244 days.

(21) Appl. No.: 15/922,286

(22) Filed: Mar. 15, 2018

(65) Prior Publication Data

US 2018/0269727 A1    Sep. 20, 2018

Related U.S. Application Data

(60) Provisional application No. 62/472,668, filed on Mar. 17, 2017.

(51) Int. Cl.
| | |
|---|---|
| *H02J 50/12* | (2016.01) |
| *H01F 38/14* | (2006.01) |
| *H02J 7/02* | (2016.01) |
| *H01F 27/28* | (2006.01) |
| *H02J 50/40* | (2016.01) |

(52) U.S. Cl.
CPC .......... *H02J 50/12* (2016.02); *H01F 27/2804* (2013.01); *H01F 38/14* (2013.01); *H02J 7/025* (2013.01); *H02J 50/40* (2016.02)

(58) Field of Classification Search
CPC . H02J 50/12; H02J 50/40; H02J 7/025; H01F 27/2804; H01F 38/14
See application file for complete search history.

(56) References Cited

U.S. PATENT DOCUMENTS

| | | | |
|---|---|---|---|
| 6,137,447 A | 10/2000 | Saitoh et al. | |
| 2010/0259217 A1* | 10/2010 | Baarman | H02J 5/005 320/108 |
| 2011/0050382 A1 | 3/2011 | Baarman et al. | |
| 2012/0049991 A1 | 3/2012 | Baarman et al. | |
| 2014/0091640 A1 | 4/2014 | Scholz et al. | |
| 2015/0054457 A1 | 2/2015 | Kim | |

(Continued)

FOREIGN PATENT DOCUMENTS

| | | |
|---|---|---|
| CN | 103168405 A | 6/2013 |
| CN | 106160263 A | 11/2016 |

(Continued)

OTHER PUBLICATIONS

W. Chen et al., "Decoupling Design of Multi-coil Wireless Power Transfer System with Metal Insulator," Emerging Technologies: Wireless Power Transfer, 2017 IEEE PELS Workshop, May 20-22, 2017, pp. 30-33.

(Continued)

*Primary Examiner* — Carlos Amaya
(74) *Attorney, Agent, or Firm* — Blank Rome LLP

(57) ABSTRACT

A scalable highly resonant wireless power coil structure that is suitable for use across a large surface area. The structure includes a plurality of single turn loops with adjacent loops that are decoupled from each other, yet form part of a single member.

26 Claims, 23 Drawing Sheets

(56) References Cited

U.S. PATENT DOCUMENTS

| | | | |
|---|---|---|---|
| 2015/0236513 A1* | 8/2015 | Covic | H02J 7/025 |
| | | | 307/104 |
| 2016/0012967 A1 | 1/2016 | Kurs et al. | |
| 2016/0126009 A1 | 5/2016 | Chien et al. | |
| 2016/0189861 A1 | 6/2016 | Nam et al. | |
| 2016/0268686 A1 | 9/2016 | Ryu et al. | |
| 2016/0285318 A1* | 9/2016 | Maniktala | H02J 50/40 |
| 2016/0336789 A1 | 11/2016 | Hyun et al. | |
| 2016/0372960 A1 | 12/2016 | Ritter et al. | |
| 2017/0054213 A1 | 2/2017 | Singh et al. | |
| 2017/0076859 A1 | 3/2017 | An et al. | |

FOREIGN PATENT DOCUMENTS

| | | |
|---|---|---|
| CN | 106253491 A | 12/2016 |
| CN | 106449049 A | 2/2017 |
| DE | 102015226784 A1 | 6/2016 |
| JP | 2017-38378 A | 2/2017 |
| TW | 201616525 A | 5/2016 |
| TW | 201638980 A | 11/2016 |
| WO | WO 98/05048 | 2/1998 |

OTHER PUBLICATIONS

Y. Li et al., "Compact Double-Sided Decoupled Coils Based WPT Systems for High Power Applications: Analysis, Design and Experimental Verification," IEEE Transactions on Transportation Electrification, vol. 4, Issue 1, pp. 1-12 (Aug. 29, 2017).

M. de Rooij et al., "Comparison of 6.78 MHz Amplifier Topologies for 33W, Highly Resonant Wireless Power Transfer," PCIM Asia 2017, Jun. 27-29, 2017, Shanghai China.

Wei-Ting et al., "A 36 W Wireless Power Transfer System with 82% Efficiency for LED Lighting Applications", Transactions of the Japan Institute of Electronics Packaging, vol. 6, No. 1, 2013, pp. 32-37.

* cited by examiner

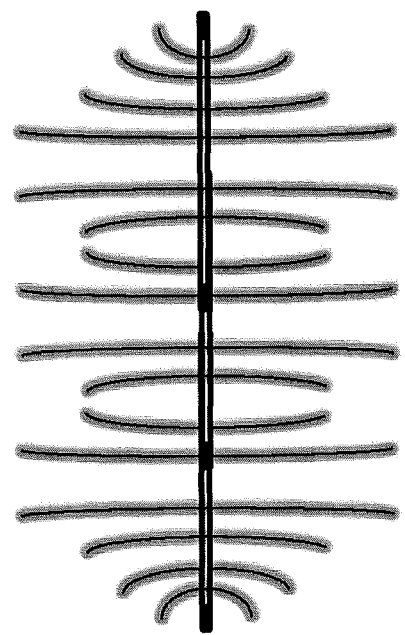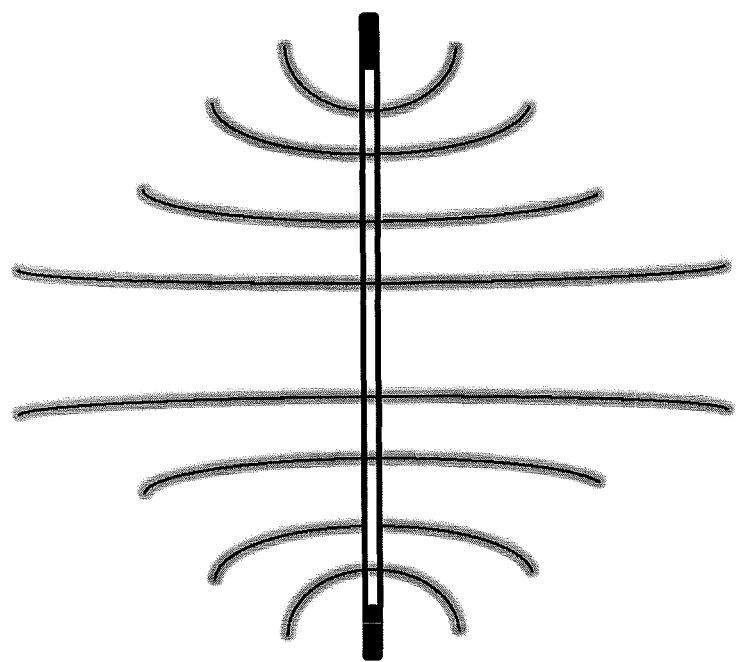
Fig. 13

LARGE AREA SCALABLE HIGHLY RESONANT WIRELESS POWER COIL

This application claims the benefit of U.S. Provisional Application No. 62/472,668, filed on Mar. 17, 2017, the contents of which are hereby incorporated by reference.

BACKGROUND OF THE INVENTION

Field of the Invention

The present invention relates to a coil structure for wireless charging and, more specifically, to a highly resonant wireless power coil structure with a plurality of single turn coils that are decoupled from each other yet are connected as a part of a single structure.

Description of the Related Art

Recently, there have been many developments in wireless power transmission systems (also referred to as an "energy transfer systems") using highly resonant electromagnetic induction. In general, such systems include a power source and transmitting coil as well as receiving coil connected to the device to be powered (i.e., the load). The architecture for wireless power transmission systems is centered on the use of coils to generate a high frequency alternating magnetic field that is used to transfer energy from the source to the load. The power source will deliver energy in the form of voltage and current to the transmitting coil that will create a magnetic field around the coil that changes as the applied voltage and current changes. Electromagnetic waves will travel from the coil, through free space to a receiving coil coupled to the load. As the electromagnetic waves pass by the receiving coil, a current is induced in the receiving coil that is proportional to the energy that the receiving coil captures.

One conventional coil layout for a wireless power transmission system is a basic spiral loop. FIG. 1 shows a basic spiral loop coil. In the basic spiral loop coil, the inductance L of the coil is proportional to $N^2$, where N is the number of turns of the coil. This type of coil is typically used on smaller, low power systems, less than 20 W.

Another conventional coil layout is a basic interleaved spiral loop. FIG. 2 shows a basic interleaved spiral loop coil comprising two interleaved loop windings. One winding is shown as one continuous line. The other winding is shown as dashes. Continuous, dashed and dotted lines are shown in this and other figures to identify windings separate from each other. The dash and dotted lines do not indicate that the windings themselves are physically formed in a dash or dotted fashion.

In FIG. 2, the two windings can be configured in series for high inductance or in parallel for low inductance. This type of loop coil is typically used on wireless power transmitters (i.e., power source side). The mirror image pattern shown in FIG. 2 provides near uniform magnetic field at the charge surface (a specific distance from the coil). This type of loop coil is used for medium power applications (up to 70 W systems). The physical size of the coil is limited to approximately a 12 inch square.

Another conventional coil layout is a single turn loop. FIG. 3 shows two single-turn loop coils, each with the same diameter, in an overlapping configuration. The two loop coils may have the same diameter. When the center distance (the distance between the centers of two coils) is about 0.766×coil diameter as shown in FIG. 3, the two loops are decoupled; i.e., they cannot influence each other; stated another way, the mutual inductance approaches zero. The coupling can be as low as about −95 dB ($S_{12}$, $S_{21}$). In other words, when the left loop of FIG. 3 is Antenna 1 and the right loop of FIG. 3 is Antenna 2, with 1 W (0 dB) delivered to Antenna 1, the amount of power received at Antenna 2 is −95 dB, and vice versa. It is not necessary for the loops to have the same diameter.

If the two decoupled loops are connected in series, the inductance will be the sum of the inductance of the loops regardless of the direction of current in either loop. If the current direction in each loop is the same, then the magnetic field (out of or into the page) will be the same. This is useful for wireless power transfer, as each loop generates a portion of the field required for power transfer. Exact center distancing of the coils in FIG. 3 can be determined by utilizing a finite element analysis software.

Another conventional coil layout is three decoupled single-turn loops. FIG. 4 shows three decoupled single-turn loops, basically an expansion of the configuration shown in FIG. 3, from two to three loops. Full decoupling of the three loops depends on the distance between the loops. While loops of the same diameter make it easier to find the distance between the loops to decouple the loops, same size loops are not required to decouple the loops.

SUMMARY OF THE INVENTION

The present invention is an expansion on the prior art in that the decoupled loops are merged into a single (continuous) coil, and the multiple loop coils can be configured into clusters.

The present invention provides a scalable high resonant wireless power structure that is suitable for use across a large surface area by presenting a single coil of multiple turns or loops that are decoupled from each other.

Other features and advantages of the invention will become apparent when the following description is read in conjunction with the accompanying drawings.

BRIEF DESCRIPTION OF THE DRAWINGS

FIG. 13 shows a comparison of the magnetic field flux for equivalent area wireless power coils—a traditional winding structure vs. a coil cluster structure according to an embodiment of the present invention.

DETAILED DESCRIPTION OF THE INVENTION

In the following detailed description, reference is made to certain embodiments. These embodiments are described with sufficient detail to enable those skilled in the art to practice them. It is to be understood that other embodiments may be employed and that various structural, logical, and electrical changes may be made. Moreover, while specific embodiments are described in connection with energy transfer systems, it should be understood that features described herein are generally applicable to other types of circuits.

Figure 1:
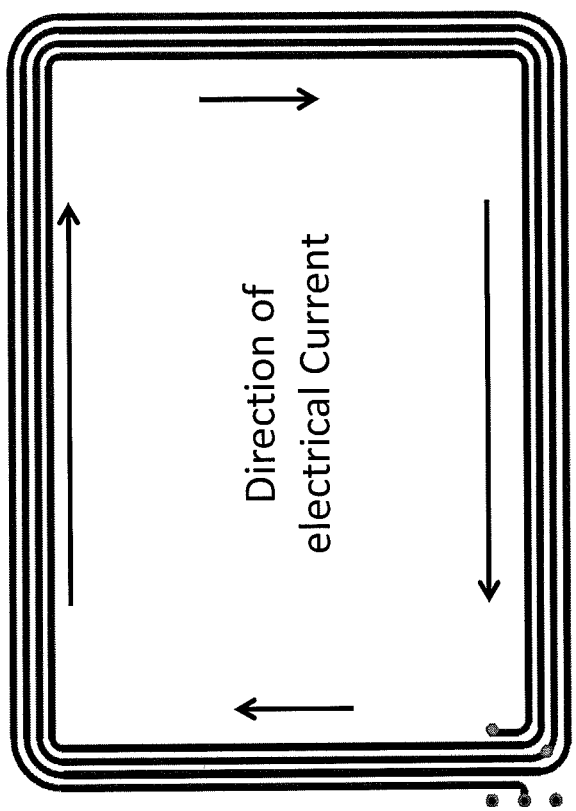
FIG. 1 shows a basic spiral loop coil.
Figure 2:
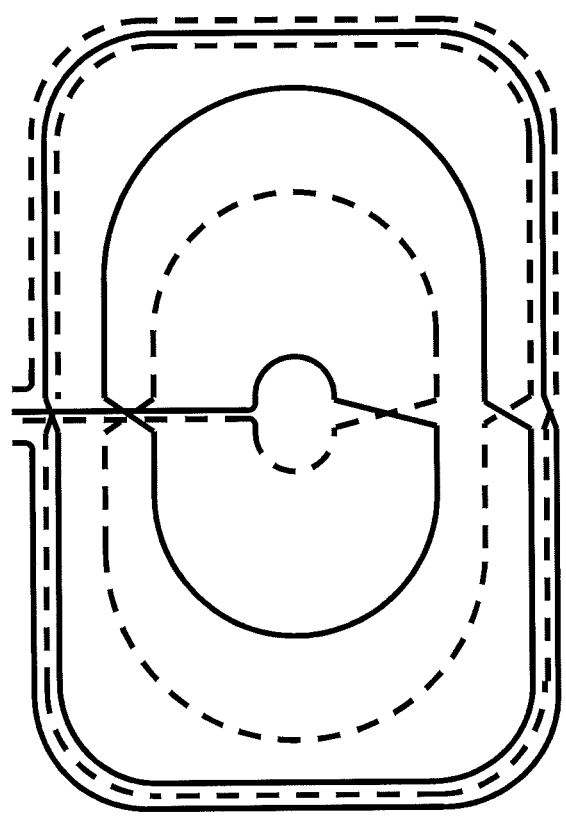
FIG. 2 shows a basic interleaved spiral loop coil comprising two interleaved loop windings.
Figure 3:
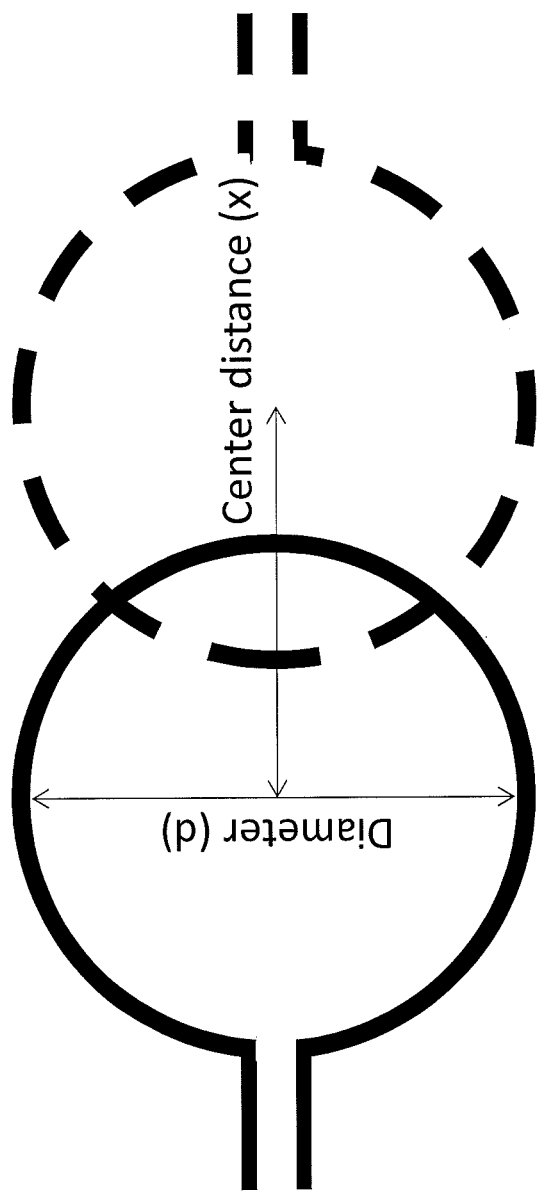
FIG. 3 shows two single-turn loop coils, each with the same diameter, in an overlapping configuration.
Figure 4:
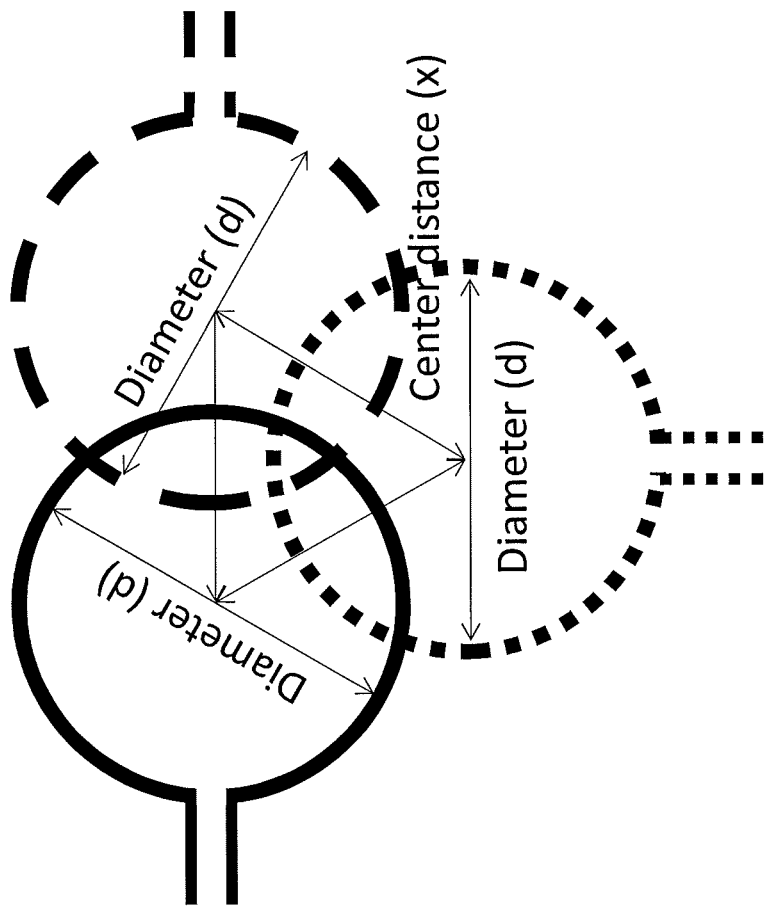
FIG. 4 shows three single-turn loops each with the same diameter, in an overlapping configuration.
Figure 5:
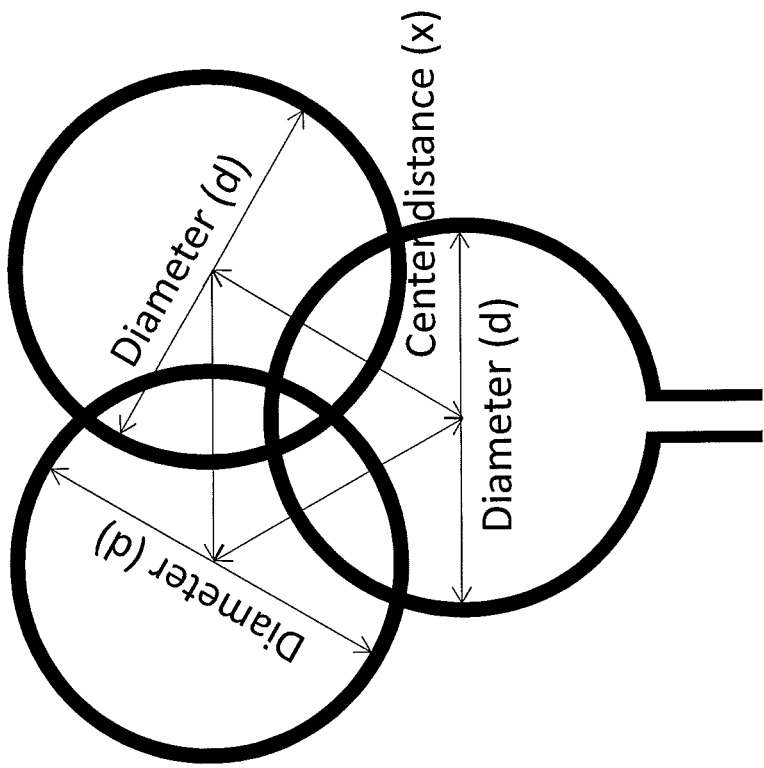
FIG. 5 shows a single coil with three decoupled loops, according to an embodiment of the present invention.

FIG. 5 shows a single coil with three decoupled loops, according to an embodiment of the present invention. The three loops are combined into a single coil with the inductance of three times the single loop inductance. If all the loops are circular and of the same diameter the center of the loops must be spaced apart at a distance of around 0.766× diameter or more for decoupling with each other.

Figure 6:
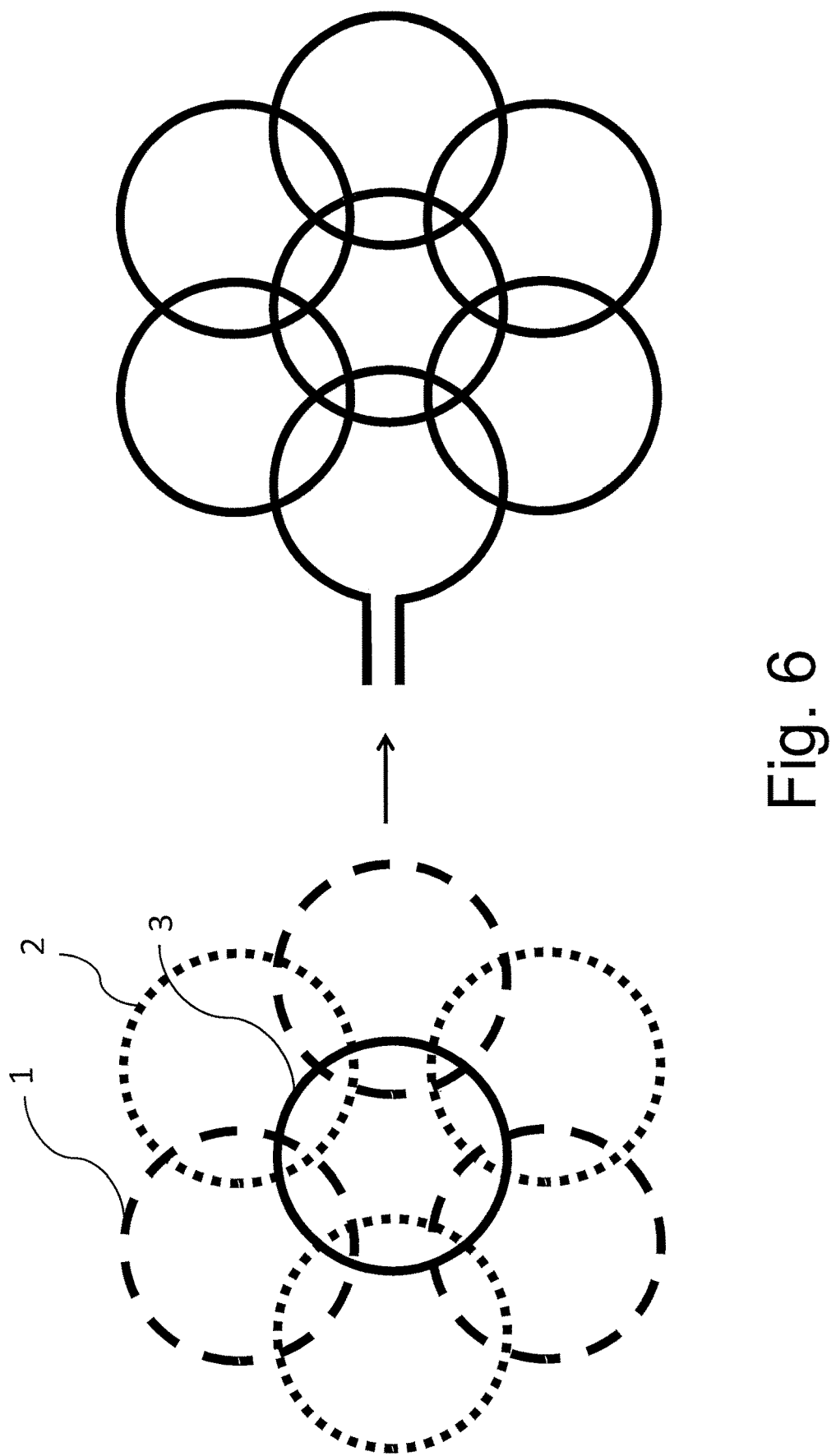
FIG. 6 shows a single coil with multiple decoupled loops, according to an embodiment of the present invention.

FIG. 6 shows a single coil with multiple decoupled loops, according to an embodiment of the invention. In FIG. 6 embodiment, loops formed from multiple coils (left) are combined into a single coil of multiple loops (right). When loops are formed from multiple coils (left), it is no longer possible to fully decouple some loops with each other, such as the loops illustrated in dashes or loops illustrated in dots. The loops shown as dashes 1, the loops shown as dots 2, and the center loop 3 of the left of FIG. 6 are decoupled from each other. But there is coupling between each of the loops shown as dashes 1, and between each of the loops shown as dots 2. By combining the multiple coils into a single coil of multiple loops (right), the combined loops combine into a coil with low inductance compared to a spiral coil designed to the same area. Each of the small loops on the right can be individually tuned by simply adding a series of capacitors. This lowers the impedance of the loop, helping to decouple non-adjacent loops. Further, it increases the immunity to detuning (imaginary impedance shifts) due to external factors such as a solid foreign metal object.

With the decoupling of the loops, the inductance resulting from the combination of small loops (right), connected in series, is relatively low in comparison to an equivalent sized winding coil (left). Low induction coils are advantageous in wireless power transfer because of the lower impact of the environment on imaginary impedance variation. Simply put, smaller loops are more immune to environmental factors.

Figure 7:
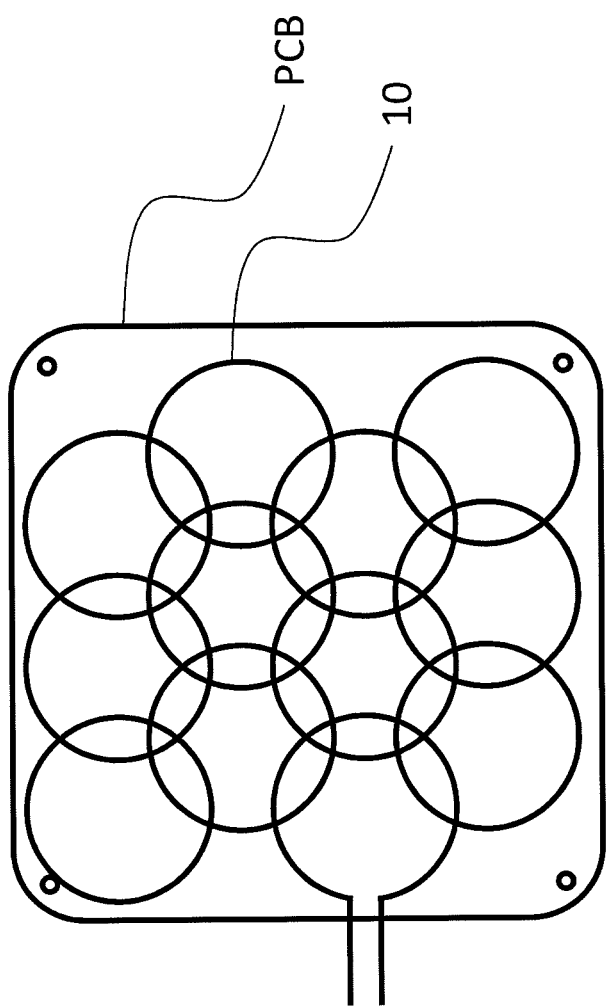
FIG. 7 shows multiple loops formed into a coil cluster, according to an embodiment of the present invention.

FIG. 7 shows multiple loops formed into a coil cluster, according to an embodiment of the present invention. The coil cluster of FIG. 7 is formed using a single coil 10 of multiple loops on a PCB. The single coil 10 is wound on a PCB to form a pattern of multiple circular loops. The multiple circular loops are connected in series. The coil cluster is provided to maintain its pattern of multiple circular loops, wherein the loops are equidistant from each adjacent loops, in both x and y directions. This allows the patterns of the coil loops to be maintained when the coil clusters are overlapping so that coil clusters are decoupled with other coil clusters. This also allows each adjacent loops of the connected coil clusters to be decoupled with each other.

Figure 8:
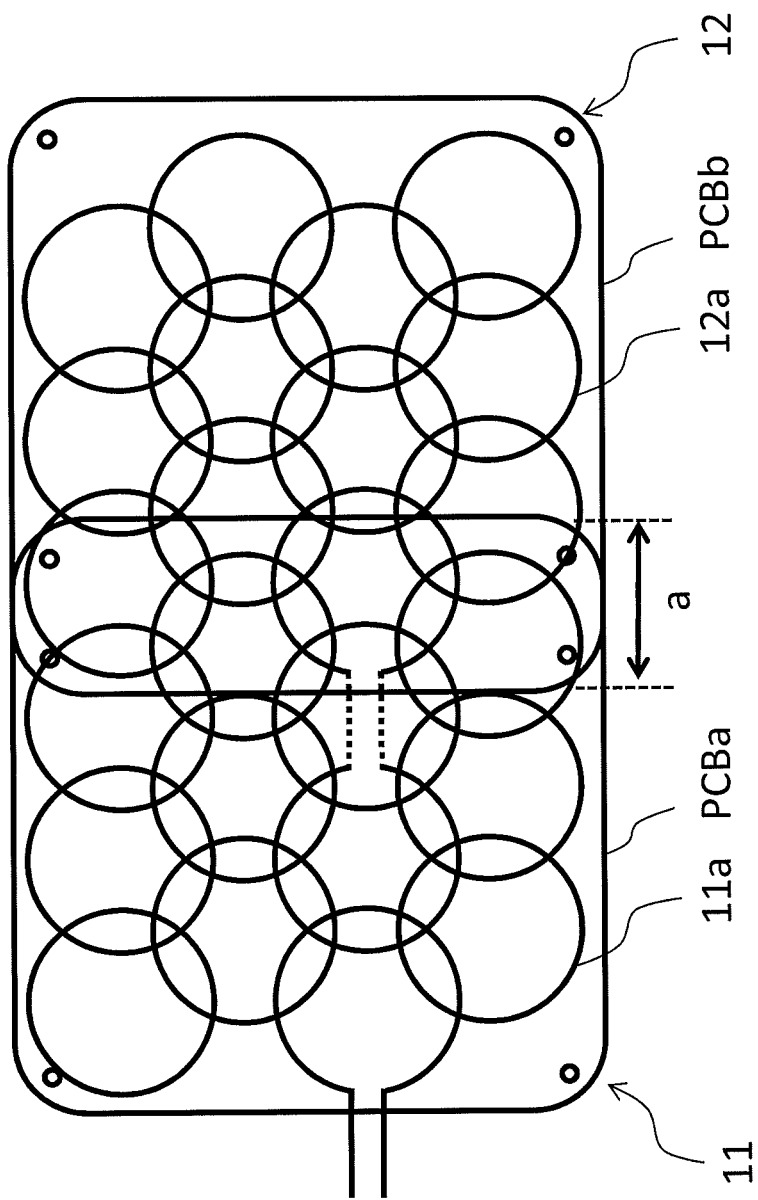
FIG. 8 shows two coil clusters connected in series to form a larger area single winding, according to an embodiment of the present invention.

FIG. 8 shows two coil clusters 11, 12 connected in series to form a single winding according to an embodiment of the present invention. The interconnection between coil clusters is shown as dots. As noted above regarding dashes and dots used to illustrate coils, the dots in FIG. 8 are used to simply indicate the location of the interconnection between the coils 11a, 12a. The dots do not indicate that the interconnection is made by using coil path that is physically broken into dots. Each coil cluster 11, 12 is formed using a single coil 11a, 12a on a PCB PCBa, PCBb. In this embodiment, the PCBs of the two coil clusters 11, 12 partially overlap (a) so that the loops of the connected coils 11a, 12a can maintain a pattern where each loop is equidistant to its adjacent loops.

A capacitor may be coupled to the connected coils 11a, 12a to match conjugate impedance used for tuning. The capacitor may be placed on the interconnection between the coils 11a, 12a shown as dots. Alternatively, or in addition, the capacitor may be placed at electrical equidistant locations from each coil clusters to enhance voltage balance and field uniformity of the connected coil clusters.

Figure 9:
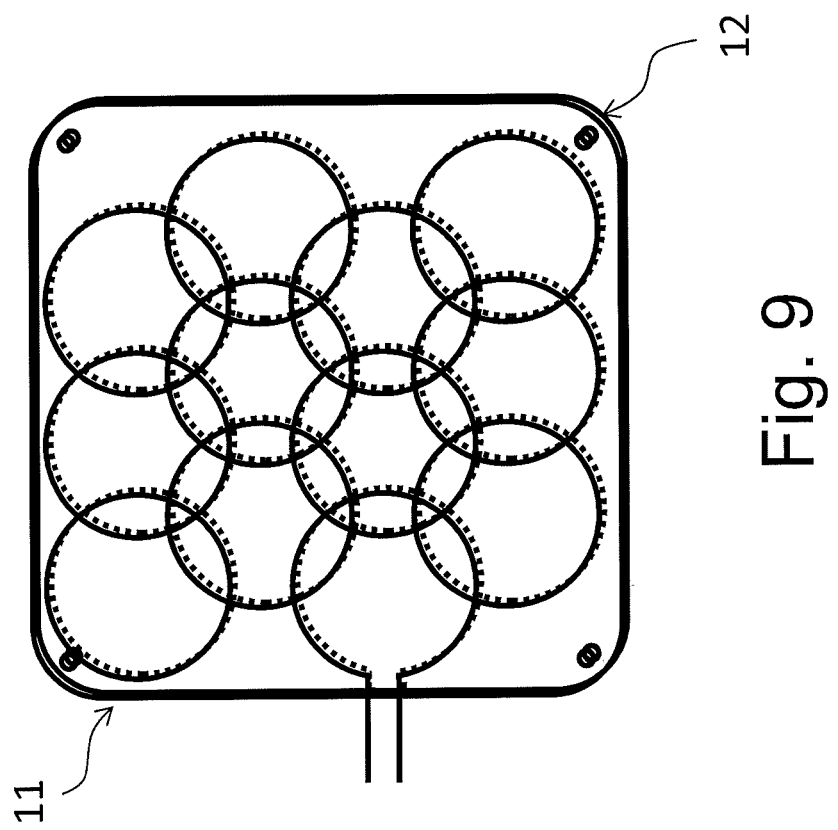
FIG. 9 shows overlapped coil clusters, which may be connected in parallel or in series, according to an embodiment of the present invention.

FIG. 9 shows overlapped coil clusters, according to an embodiment of the present invention. In the FIG. 9 embodiment, the two coil clusters 11, 12 almost completely overlap. The coils of each cluster may be connected in parallel or series. Each coil cluster may have a different pattern of loops. The same pattern of loops, however, may be utilized to simplify the design of the coil clusters.

Figure 10:
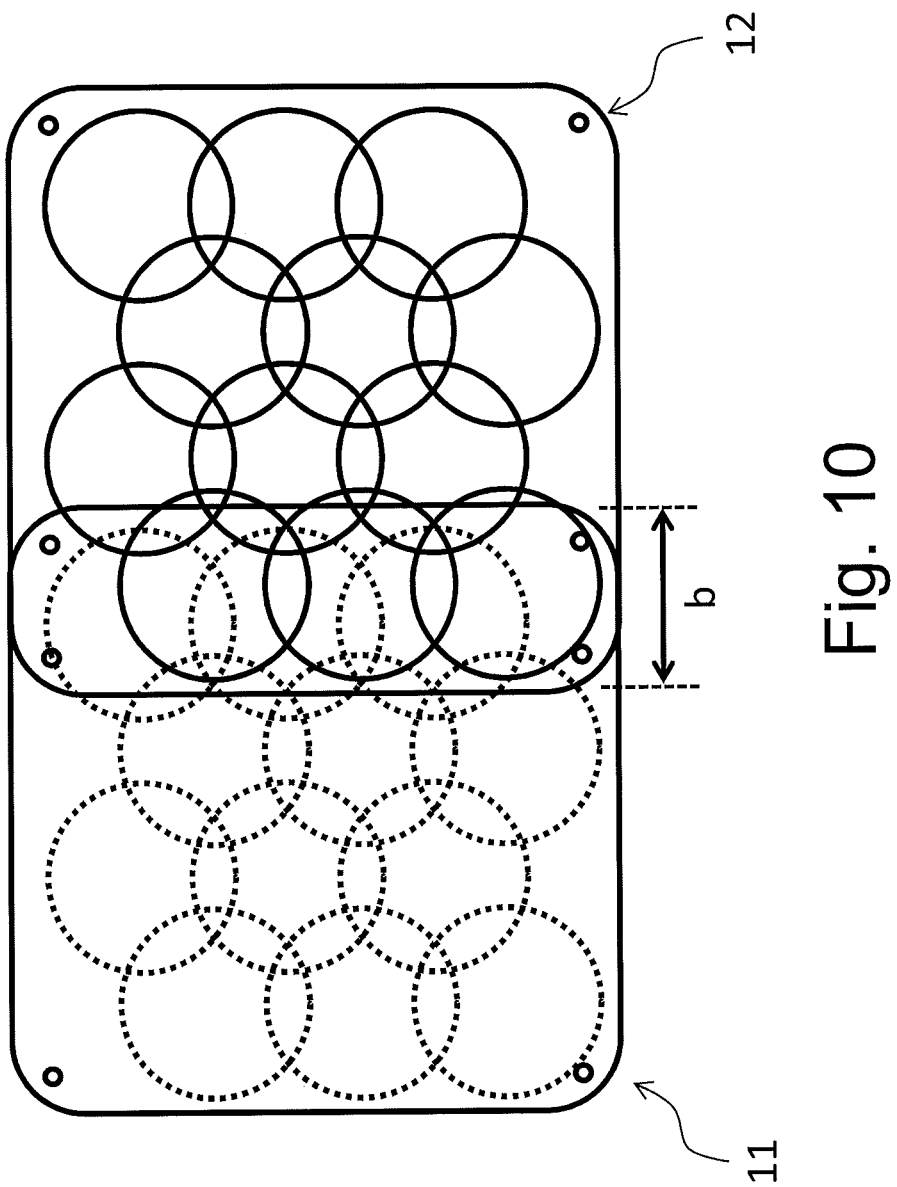
FIG. 10 shows how coil clusters according to an embodiment of the present invention may be overlapped and decoupled, similar to how loops can be overlapped and decoupled.

FIG. 10 shows how coil clusters of the present invention can be overlapped and decoupled, similar to how loops can be overlapped and decoupled, according to an embodiment of the present invention. For coil clusters to be decoupled, the magnetic fields of the clusters need to cancel each other out perfectly in a similar manner each loop does. This may require overlapping of the coil clusters as shown in FIG. 10. The cluster center of magnetic field determines the location and distance between the coil clusters 11, 12 and how much the coil clusters should overlap b. Magnetic field analysis tools may be necessary to determine where the center of the magnetic field is located.

Figure 11:
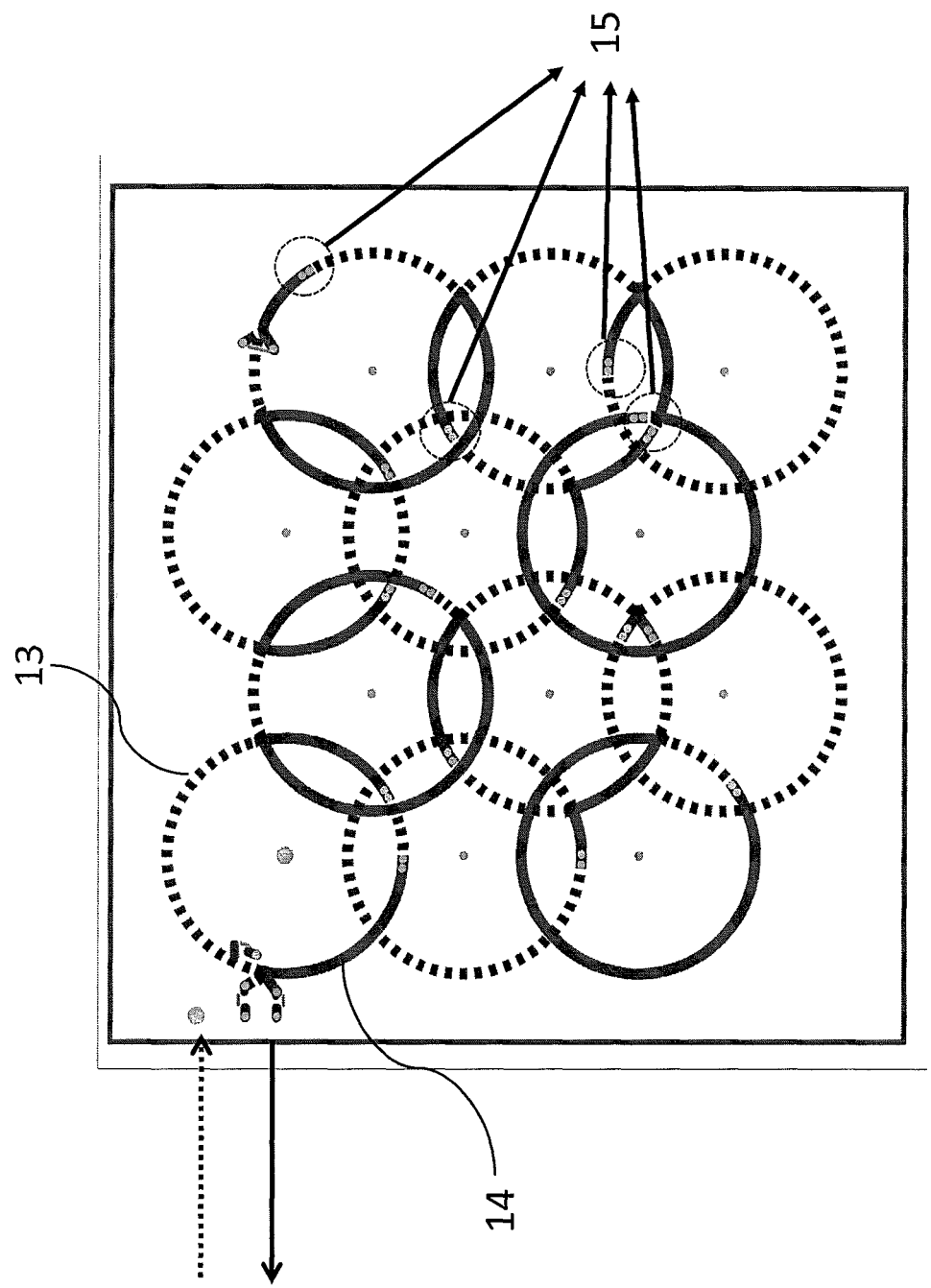
FIG. 11 shows a winding method for forming a coil cluster according to an embodiment of the present invention.

FIG. 11 shows the winding path for a coil cluster according to an embodiment of the present invention. In FIG. 11, the coil shown as dashes 13 is wound on one side of a PCB and the coil illustrated using a continuous-line 14 is wound on the opposite side of the PCB. Coil 13 and coil 14 of FIG. 11 are connected to each other through multiple vias formed in the PCB. In FIG. 11, the vias are shown as grey dots 15 on coil 13 and coil 14. As shown in FIG. 11, the entire coil winding can be traced without lifting the "pen." Further, the entire coil may be wound on the PCB so that it could be traced without repeating a single segment.

One skilled in the art will readily recognize that the embodiment of FIG. 11 has many variations. For instance, a coil cluster can be designed using two layer printed circuit boards or a flexible equivalent. In such configuration, a single coil is wound on the top side of PCB or top layer PCB to form the pattern illustrated as dots in FIG. 11. The single coil further extends to the bottom side PCB or bottom layer PCB to form the pattern illustrated using a continuous line in FIG. 11. One skilled in the art will also readily recognize that the winding path according to an embodiment of the present invention can follow many paths to yield the same end result.

Figure 12:
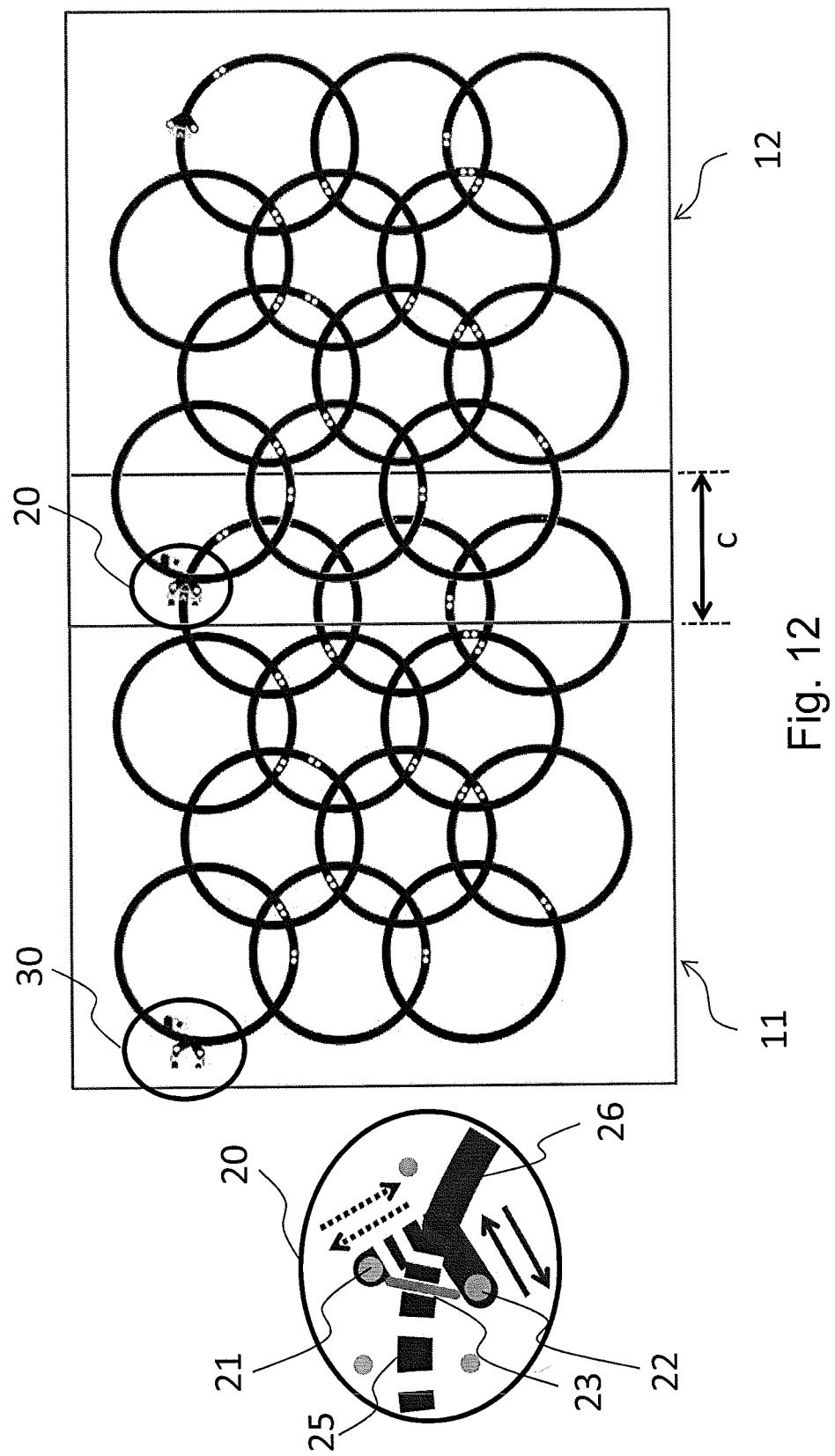
FIG. 12 shows a coil cluster design that allows series or parallel connection of clusters in accordance with the present invention.

FIG. 12 shows a coil cluster design that allows series or parallel connection of coil clusters in accordance with an embodiment of the present invention. By utilizing the same coil layout (e.g., coil clusters with substantially similar or same coil layout patterns), the embodiment of FIG. 12 allows the reduction of product component variation count.

In FIG. 12, two coil clusters 11, 12 are placed side-by-side by partially overlapping (c) so that the pattern of the two coil clusters can be combined to form an identical pattern of a larger size. Circled area 20, which is shown in an exploded view to the left of the overlapped coil clusters 11, 12, illustrates how the coils 11a, 12a of the two coil clusters 11, 12 are connected in series. Similar to FIG. 11, the coil shown as dashes 25 reflects a coil wound on one side of a PCB while the coil illustrated using a continuous-line 26 reflects a coil wound on the other side of the PCB.

In the embodiment of FIG. 12, coil 25 of area 20 is a part of the coil wound on the left coil cluster 11, and in particular, a coil wound on the top side of the left coil cluster's PCB. In this embodiment, the left coil cluster 11 overlaps the right coil cluster 12 so that the overlapping portion (c) of the left coil cluster 11 is placed above the right coil cluster 12. Coil 26 of area 20 is a part of the coil wound on the bottom side of the right coil cluster's PCB. Accordingly, coil 26 of area 20 is a coil positioned on the bottom side of the PCB of the left coil cluster 11.

Each of both coil clusters 11, 12 comprises multiple vias to provide path for coils to penetrate the PCB and be wound on either side of the PCB or connect with a coil wound on the other side of the PCB. The vias are marked as grey dots on the coil traces, shown left to the overlapping coil clusters 11, 12. As illustrated in area 20, coil 25 of the left coil cluster 11 enters via 21 to connect with the coil of the right coil cluster 12. The end of coil 25 entering via 21 is barb shaped. Similarly, coil 26 entering via 22 from the bottom side of the left coil cluster 11, which is a part of the coil wound on the bottom side of the right coil cluster 12, has a barb shaped end. The barb shaped ends of the coils of area 20 form an arrow shape to ensure magnetic flux cancellation, leaving the original current path intact, and maintain field uniformity of the connected coil clusters.

Coil 25 entering via 21 and coil 26 entering via 22 are physically connected and occupy space forcing the connection point to move from the ideal winding path. The impact of moving the connection point away from its ideal path can be reduced by flux canceling the currents going into and out of the connection points on each of the various PCBs, substrates, and/or loops. Flux cancellation is achieved by substantially overlapping the conductors carrying the same current but flowing in opposite directions. The barb shaped ends shown in FIG. 12 cancel flux. The connection point also serves as a connection point for the last cluster connection that continues the coil current path 23.

Circled area 30 in FIG. 12 reflects an area at which the coils of two completely overlapping coil clusters may be connected in parallel. Again, those skilled in the art will recognize that this procedure has many variations. It also serves as the connection point to an amplifier that powers the coil.

FIG. 13 shows a comparison of the cross-sectional magnetic field flux for equivalent size wireless power coils—a traditional winding structure is shown on the left, and the coil cluster structure of an embodiment of the present invention is shown on the right. As illustrated, the coil cluster structure according to an embodiment of the present invention has a shorter magnetic field radiation pattern than the conventional power coils with a traditional winding structure.

Advantageously, in accordance with an embodiment of the present invention:

Loops can be made small. Loop diameter translates into wireless power distance (distance from the coil to the charge surface). With small loop diameters, short transmission distance is possible.

The coil loop structure of an embodiment the present invention is scalable over large surface areas.

The power coil of an embodiment of the present invention can be made into flex circuits (limits to bend radius as function of loop diameter), such as polyimide based flexible circuit.

Each individual loop can be independently tuned by adding a series capacitor. This lowers the impedance of the loop, helping to decouple non-adjacent loops. Furthermore, it increases the immunity to detuning (imaginary impedance shift) due to environment factors such as foreign solid metal objects.

Multiple tuned or untuned coil clusters can be connected in parallel.

The power coil of an embodiment the present invention is highly immune to environmental operating conditions that can lead to large variations in imaginary coil impedance typically experienced with traditional wireless power coils. The larger the coil size, the more the coil is susceptible to environmental factors, such as solid metal objects, and the more likely to exhibit large changes in inductance. Due to the relatively smaller loop diameter, and shorter transmission distance, an embodiment of the present invention is less likely to be affected by solid metal.

The power coil of an embodiment of the present invention significantly reduces magnetic field magnitude distance for wireless power transfer. This is useful for high power large area designs where specific absorption ratio (SAR) becomes a concern.

The coil loop structure of an embodiment of the present invention can be employed in both transmitters (sources) and receivers (devices).

The most significant differences between the power loop coil according to an embodiment of the present invention and Magnetic Resonance Imaging (MRI) coils are as follows:

MRI loops are singular; i.e. one loop for one receiver.

MRI loops, which comprises multiple singular loops, may also be used as transmitters. This significantly reduces transmit power requirements. To the contrary, an embodiment of the present invention may have multiple loops from a single coil, increasing transmit power.

MRI loops may have various patterns including but not limited to circular, ellipse, square, rectangle. MRI loops do not have multiple turns.

MRI loops are usually never connected in series or parallel, this is a key feature for wireless power systems where the goal is to distribute the magnetic field. In the present invention, multiple loops are connected together to create a larger, more uniform distributed field.

MRI systems make use of a very low impedance load, either with a receiver or a transmitter, to further decouple loops, particularly the loops that are not adjacent to each other (e.g., green or blue loops of FIG. 6). Wireless power systems are specifically designed to accommodate large impedance variations as load and environment conditions change. Wireless power systems with loops according to an embodiment of the present invention has higher tolerance to load and environment condition variance and do not have the strict decoupling requirements of an MRI system seeking the highest quality information to reconstruct an image.

Figure 14:
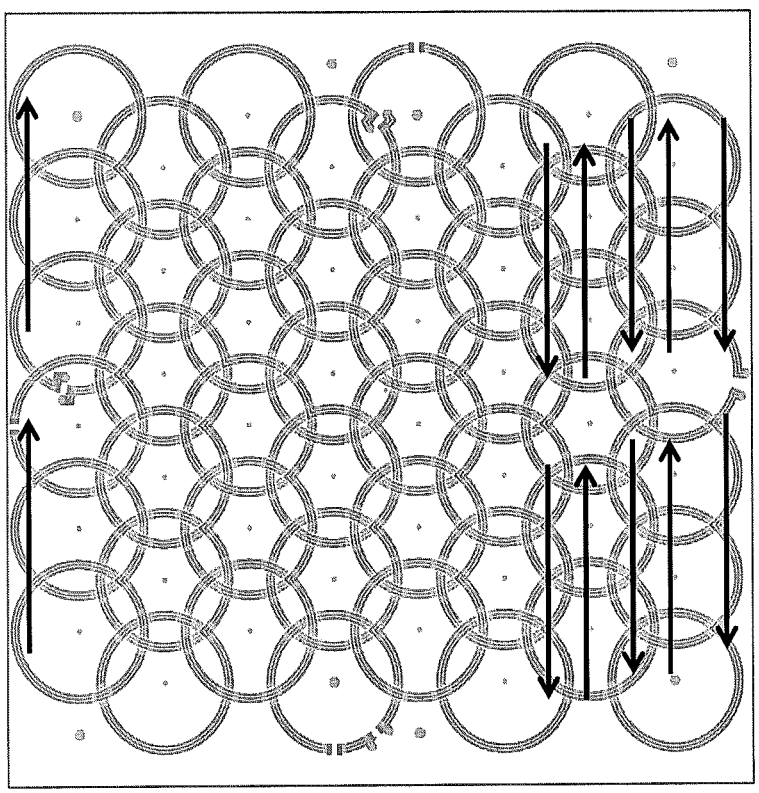
FIG. 14 shows a coil winding path formed on a PCB of a coil cluster according to an embodiment of the present invention.

FIG. 14 shows a coil winding path formed on a PCB according to an embodiment of the present invention, a zig-zag winding method. The arrows of FIG. 14 reflect the direction of the winding path for the forming of the coil pattern of FIG. 14 at a point in time. The coil pattern formed pursuant to the zig-zag winding method has a better defined electro-magnetic field, which in turn allows coil clusters to be properly connected with each other with minimal common mode coupling due to electric fields.

Figure 15:
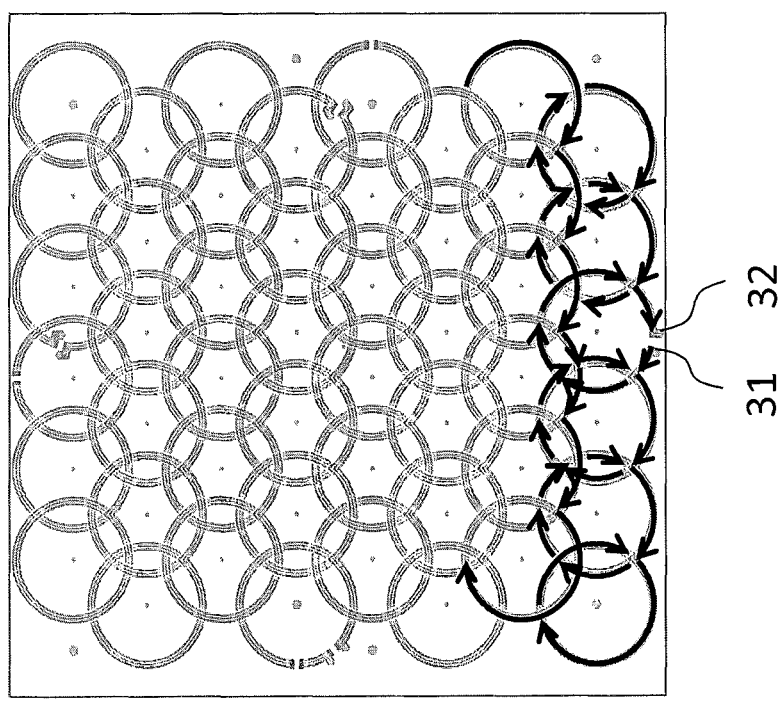
FIG. 15 shows a coil winding path on a top side of a PCB of a coil cluster according to an embodiment of the present invention.
Figure 16:
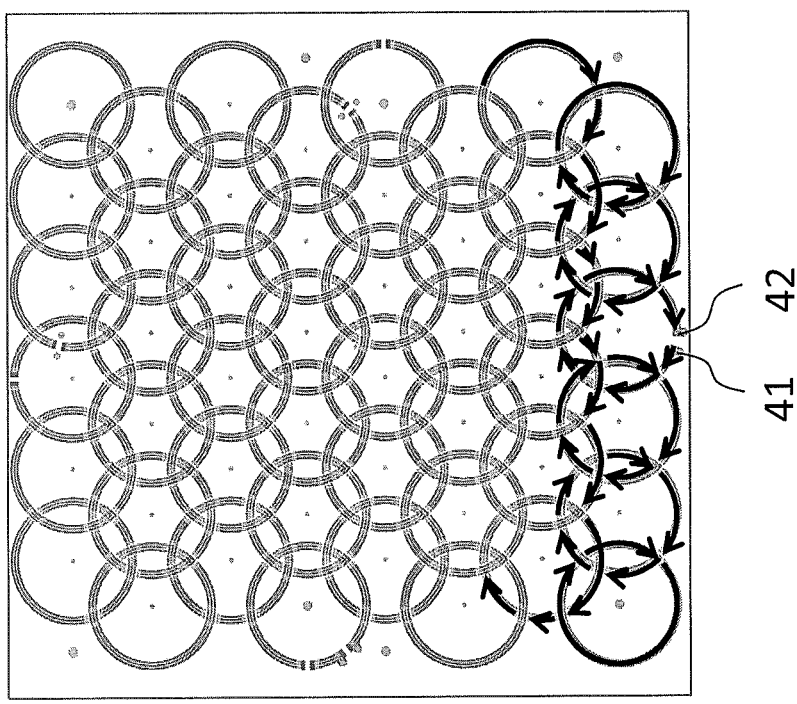
FIG. 16 shows a coil winding path on a bottom side of a PCB of a coil cluster according to an embodiment of the present invention.

FIGS. 15 and 16 show the winding path of a coil wound on a top side and a bottom side of a PCB pursuant to the zig-zag method illustrated in FIG. 14, respectively. In FIG. 15, the looping pattern starts with the entry arrow 31 and ends at the exit arrow 32 and can be drawn without lifting the "pen" or drawing over the same location twice when traced in combination with FIG. 16. Similarly, in FIG. 16, the looping pattern starts with the entry arrow 41 and ends at the exit arrow 42. As discussed later in FIGS. 20-22, the entry arrows 31, 41 and exit arrows 32, 42 can also serve as connection points with another coil cluster, which may be connected to the coil cluster of FIGS. 15 and 16 in series or in parallel.

Figure 17:
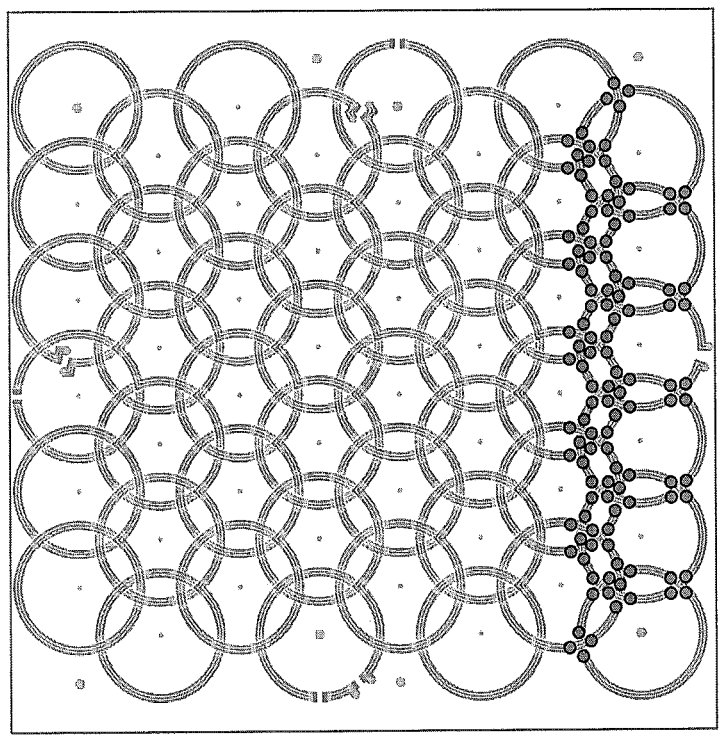
FIG. 17 shows via locations formed in a PCB of a coil cluster according to an embodiment of the present invention.

The looping pattern on the top side of a PCB on FIG. 15 overlaps, at least partially, with the looping pattern on the bottom side of the PCB on FIG. 16. FIG. 17 shows locations of vias formed in the PCB of FIGS. 15 and 16 according to an embodiment of the present invention. The coil on the top side of the PCB of FIG. 15 and the coil on the bottom side of the PCB of FIG. 16 are connected through the vias at the intersecting locations of each of the loops, which is shown as dots on FIG. 17. The vias interconnect the coils wound on opposite sides of the PCB and ensures the continuity of the coil looping design.

In FIGS. 15, 16, and 17, the vias are strategically located to allow a pen to trace the patterns on the top side of PCB on FIG. 15 and the bottom side of PCB on FIG. 16 without lifting the pen. By forming a pattern on both side of a PCB which overlaps with one other, copper content of the PCB is doubled. This reduces the resistance of the pattern.

Further, with the winding pattern of FIGS. 15 and 16, the voltage across various locations on the coil is kept low that keeps E-field generation low. This is important when creating large areas where isolated overlapping tiles need to match their potentials. In addition, this, in turn, improves E-field uniformity and electric field generation and makes it easier to distribute tuning across the coil cluster.

Figure 18:
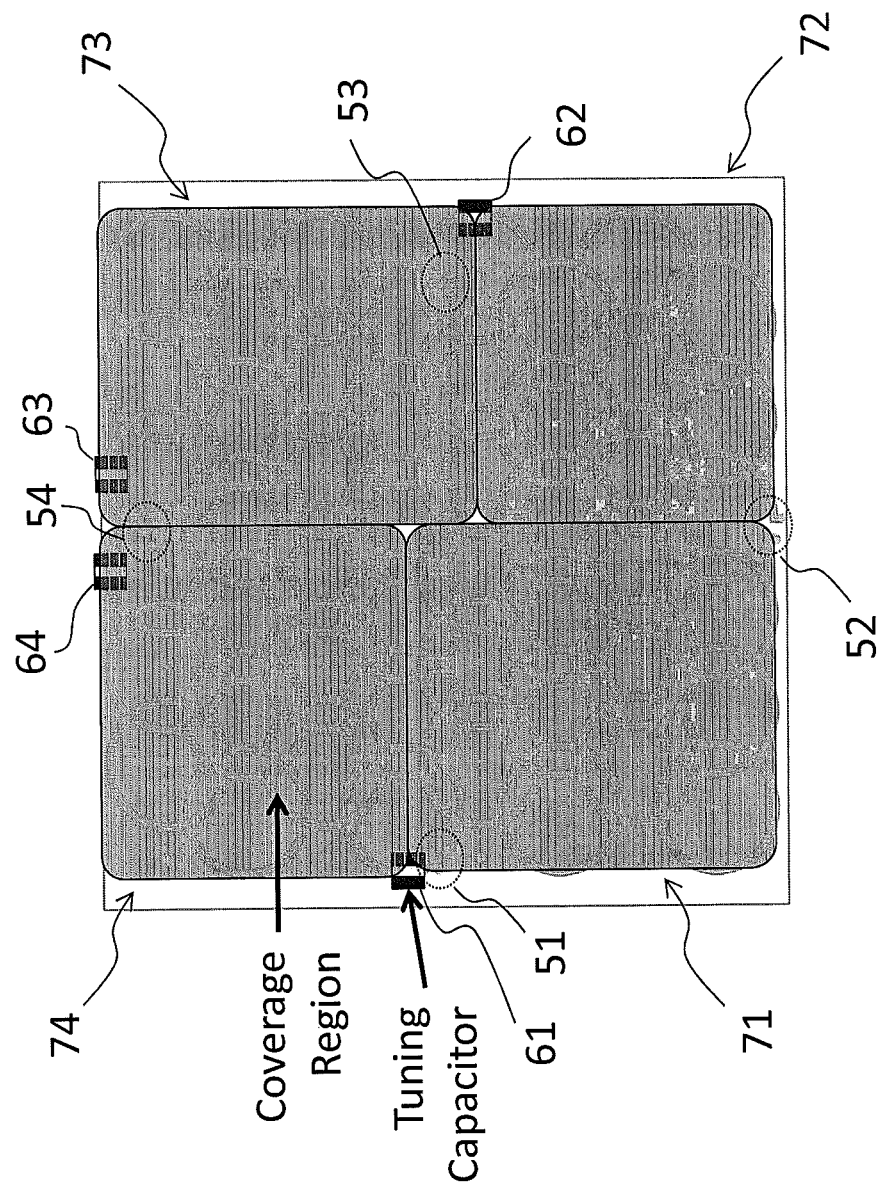
FIG. 18 shows a placement of resonant tuning capacitors on a coil cluster according to an embodiment of the present invention.

FIG. 18 shows the placement of capacitors on a coil cluster according to an embodiment of the present invention. In the embodiment, a capacitor may be placed on one side of a coil cluster for tuning, e.g., top or bottom side of a PCB of the coil cluster. Capacitors 61-64 of FIG. 18 are located at near electromagnetic equidistant points along the winding path to ensure equal capacitance values, reduce voltage differences across the coil and, reduce unwanted electromagnetic radiation. The capacitors of FIG. 18 change the phase of the voltage of the coil cluster. For instance, voltage increases as it moves along the winding path. A capacitor flips that voltage to a negative value and the next winding path works to increase the voltage again. This way, the effective voltage of the entire coil or E-field is reduced.

Each area covered by a capacitor is marked by rectangles 71-74. In FIG. 18, capacitor 63, 64 on the top side of a coil cluster may be omitted where there is no coil cluster connected to the coil cluster of FIG. 18.

Figure 19:
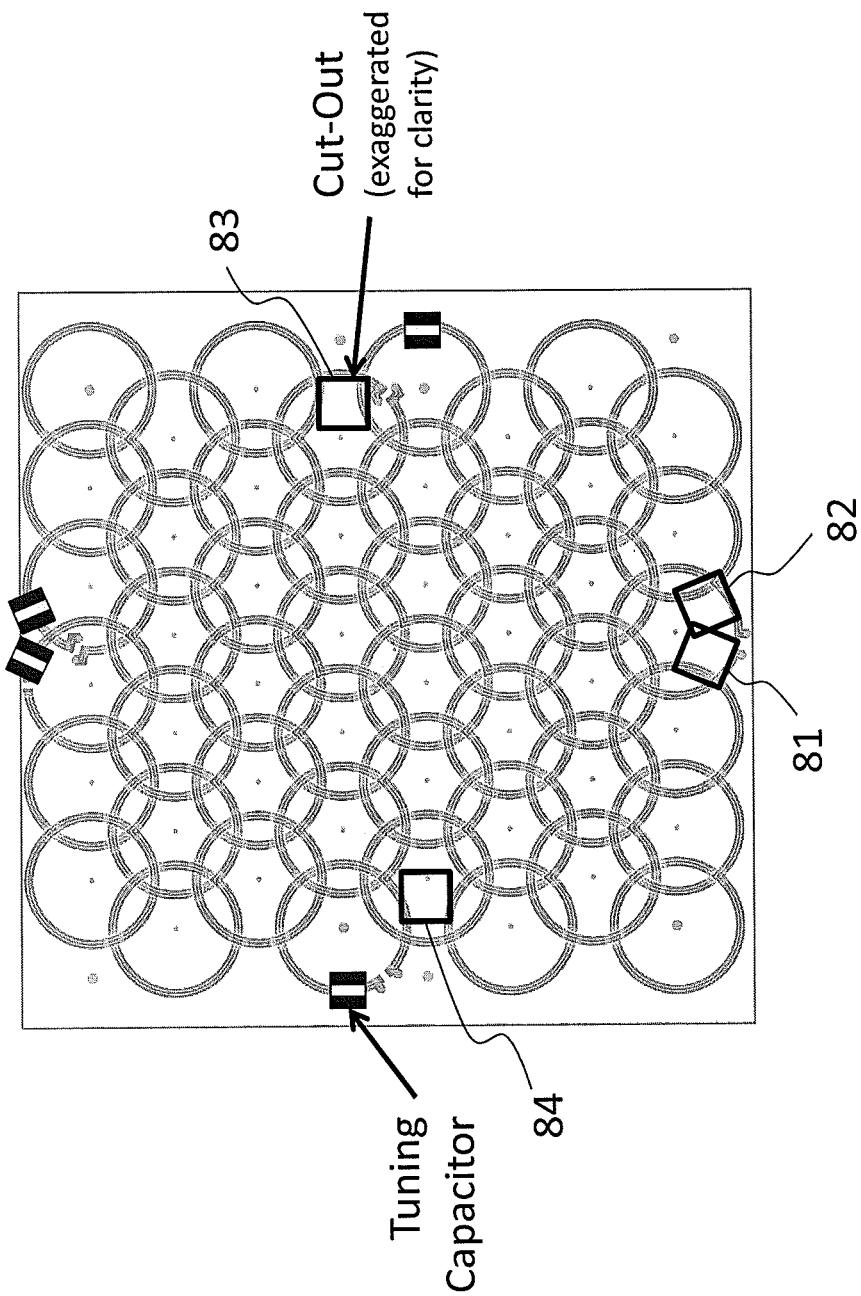
FIG. 19 shows a placement of recess areas in a PCB of a coil cluster according to an embodiment of the present invention.

FIG. 19 shows a placement of recess areas in the PCB according to an embodiment of the present invention. The recess areas 81-84 pocket capacitors of another coil cluster connected to the coil cluster of FIG. 19 to achieve a flat layout. A coil cluster may be connected to the coil cluster of FIG. 19 in x direction and/or y direction.

Figure 20:
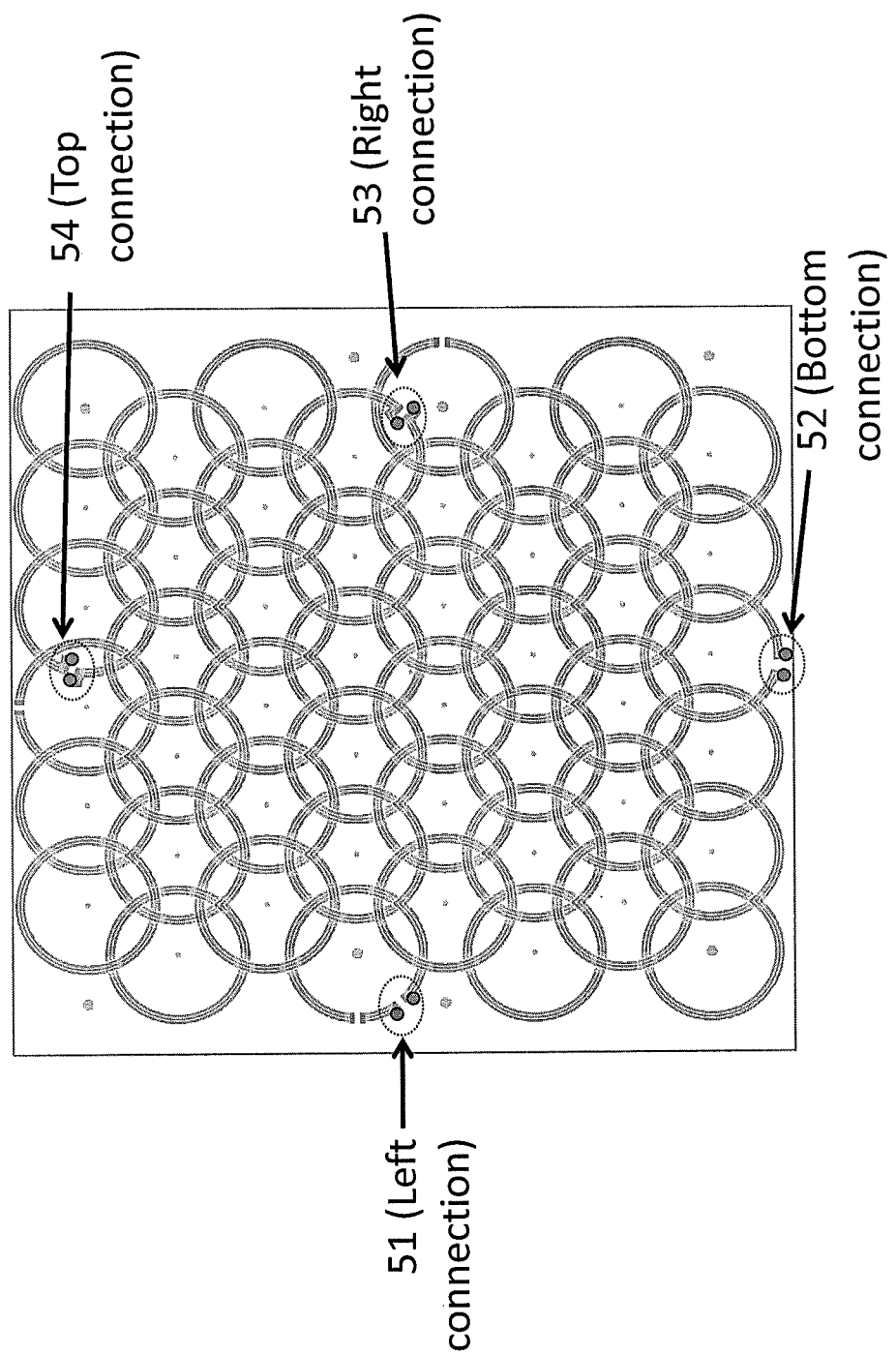
FIG. 20 shows connection points of a coil cluster according to an embodiment of the present invention.

FIG. 20 shows connection points of a coil cluster according to an embodiment of the present invention. In FIG. 20, connection points 51-54 to a coil cluster is provided on the left, bottom, right, and top sides of the coil cluster. The connection points 51-54 are used to connect coil clusters in series, either in x or y direction. Where there is no adjacent coil to be connected then that corresponding connection needs to be effectively closed (short circuited) to ensure current path continuity. The same is true for unused tuning capacitor locations.

Figure 21:
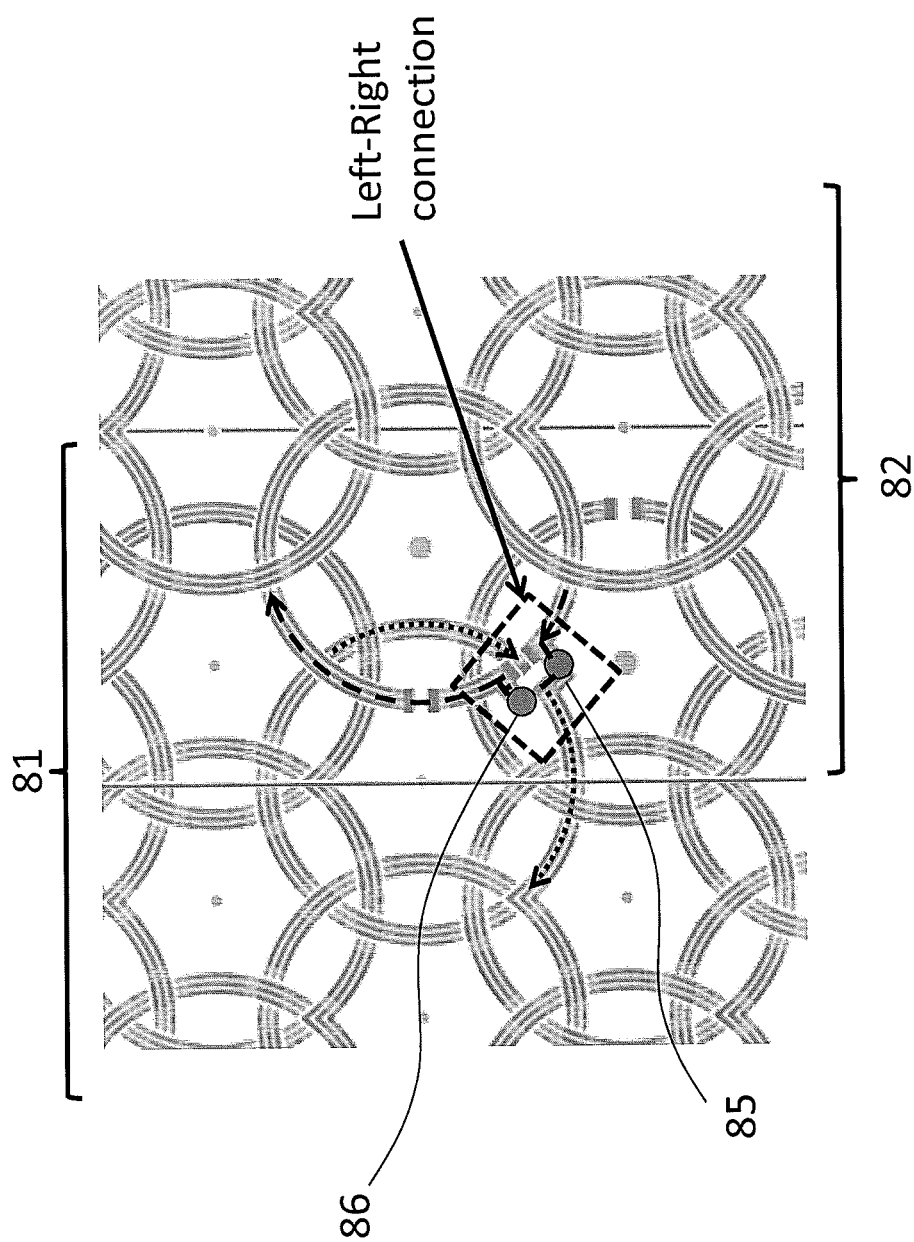
FIG. 21 shows coil clusters connected to each other horizontally (side-by-side) according to an embodiment of the present invention.

FIG. 21 shows the detail of the horizontal tile connection of coil clusters according to an embodiment of the present invention. In FIG. 21, coil cluster 81 and coil cluster 82 partially overlap and connect with each other horizontally. The portion of coil cluster 81 marked with dots is connected horizontally to the portion of coil cluster 82 marked with dashes, and current passes through the connection points 85, 86 horizontally. The in series connection of the coil clusters 81, 82 forms a coil cluster of a larger size with a pattern identical to the patterns of the coil clusters 81, 82.

Figure 22:
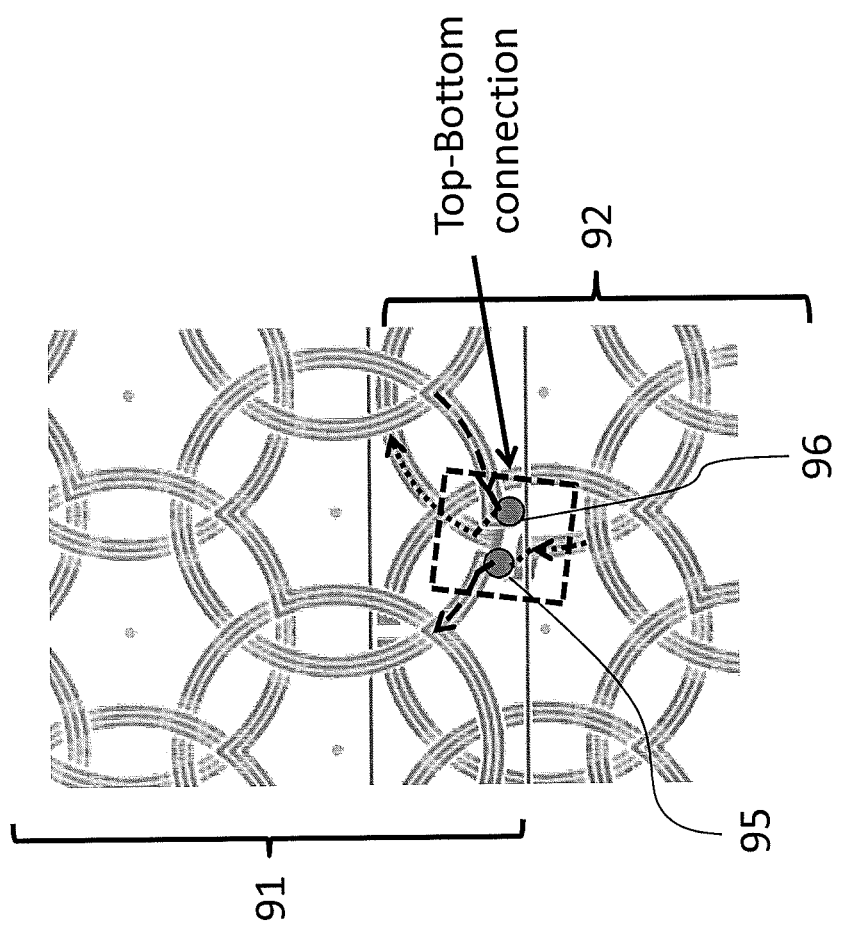
FIG. 22 shows coil clusters connect to each other vertically (top-bottom) according to an embodiment of the present invention.

FIG. 22 shows the detail of the vertical tile connection of coil clusters according to an embodiment of the present invention. In FIG. 22, coil cluster 91 and coil cluster 92 partially overlap and connect with each other vertically. The portion of coil cluster 91 marked with dashes is connected vertically to the portion of coil cluster 92 marked with dots, and current passes through the connection points 95, 96 vertically. Coil clusters can be connected horizontally, side-by-side, as illustrated in FIG. 21, and vertically, top-bottom, as illustrated in FIG. 22, to form a larger sized coil cluster with a loop pattern identical to the individual coil cluster. With smaller loops comprising the coil pattern of a larger sized coil cluster, field uniformity is more easily achieved.

Figure 23:
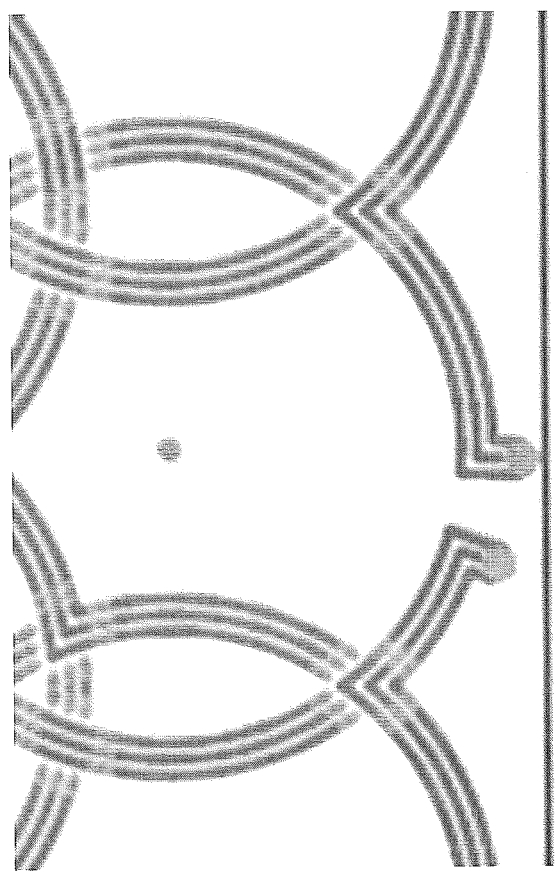
FIG. 23 shows the strands of a conductor path of a coil cluster according to an embodiment of the present invention.

FIG. 23 shows the strands of a coil wound on a PCB to form a coil cluster according to an embodiment of the present invention. In FIG. 23, three strands per layer are used to form a single conductor path (coil) of a coil cluster. Where conductor paths are formed on both side of a PCB, the three side-by-side strands may be used on both the top and bottom side of the PCB. With multiple strands, the effective conductor path of a coil cluster is wider than a single strand conductor path as proximity effects in the conductor have been reduced. A wider conductor path alters the magnetic field pattern with more flux line intersecting the conductor, and thereby increasing eddy current generation and reducing losses.

The strands forming a conductor path are effectively connected in parallel. A conductor path according to an embodiment of the present invention may be divided on 2-axis, i.e., vertically and horizontally. The multiple "strands" configuration embodiment reduces high frequency losses.

The above description and drawings are only to be considered illustrative of a specific embodiment of the invention which achieves the features and advantages described herein. Modifications and substitutions to the invention can be made. Accordingly, the embodiment of the invention described herein is not considered as being limited by the foregoing description and drawings.

What is claimed is:

1. An antenna for wireless power system comprising:
a first substrate having a plurality of vias; and
a single continuous coil wound on the first substrate to form a pattern of at least three overlapped, single turn circular loops, wherein a center of each single turn loop of the three circular single turn loops of the coil is equidistant to centers of other single turn loops of the three circular single turn loops of the coil, such that the three circular, single turn loops of the single continuous coil overlap each other and are electromagnetically decoupled from one another to reduce the inductance of the coil and to create a single uniform magnetic field, wherein the single turn loops of the single continuous coil have a winding path in which the coil passes through the vias of the first substrate, such that the coil is continuous, does not trace over itself, and no segment of the coil is repeated.

2. The antenna of claim 1, wherein diameters of the three circular single turn loops are substantially the same.

3. The antenna of claim 2, wherein the distance between the centers of the three circular, single turn loops is about 0.766 times the diameters of the three circular, single turn loops.

4. The antenna of claim 1, wherein the distance between the centers of the three circular, single turn loops is substantially the same as the distance required to decouple the loops of the three circular, single turn loops from one another.

5. The antenna of claim 1, wherein the single continuous coil is wound on both sides of the first substrate to form the pattern.

6. The antenna of claim 5, wherein the first substrate comprises a via, through which the single continuous coil wound on one side of the first substrate is connected to the single continuous coil wound on the other side of the first substrate.

7. The antenna of claim 5, wherein a portion of the pattern is formed on one side of the first substrate and a portion of the pattern is formed on the other side of the first substrate so that the combined portions on the both sides of the first substrate complete the pattern.

8. The antenna of claim 5, wherein the pattern is formed on each side of the first substrate.

9. The antenna of claim 5, wherein the patterns on the both sides of the first substrate overlap with each other.

10. The antenna of claim 1, wherein:
the single continuous coil is wound horizontally to form a first portion of the pattern and horizontally to form a second portion of the pattern below the first portion, and
the first portion of the pattern forms a path of a current to flow in one direction and the second portion of the pattern forms a path of a current to flow in the opposite direction.

11. The antenna of claim 1, wherein the single continuous coil further comprises a connection point to connect with a second single continuous coil wound on a second substrate.

12. The antenna of claim 1, further comprising a capacitor coupled to the single continuous coil.

13. The antenna of claim 1, further comprising:
a second substrate; and
a single continuous coil wound on the second substrate to form a pattern substantially the same as the at least three circular, single turn loops pattern of the single continuous coil of the first substrate;
wherein the single continuous coil of the first substrate and the single continuous coil of the second substrate are connected in series.

14. The antenna of claim 13, further comprising a capacitor coupled to, and disposed between, the coils of the first and the second substrates.

15. The antenna of claim 13, further comprising a capacitor coupled to at least one of the coils of the first and second substrates and located at a point electromagnetically equidistant to the coils of the first coil and the second substrates.

16. The antenna of claim 13, wherein the first substrate and the second substrate overlap at least partially to decouple the single turn loops formed by the coils of the first and second substrates.

17. The antenna of claim 16, wherein the overlapping of the first and second substrates are based on a distance between magnetic field centers of the first and second substrates to electromagnetically decouple the coils of the first and second substrates.

18. The antenna of claim 16, wherein:
the first and second substrates each comprises a connection point,
the single continuous coil wound on the first substrate and the single continuous coil wound on the second substrate are connected through the connection points, and
an end of the coil entering the connection point of the first substrate and an end of the coil entering the connection point of the second substrate substantially overlap to carry the same current in opposite directions to cancel flux.

19. The antenna of claim 18, wherein:
a first one of the single continuous coils is wound on both sides of the first substrate to form the pattern of at least three circular loops,
a second one of the single continuous coils is wound on both sides of the second substrate to form the pattern of at least three circular loops, and
the first single continuous coil and second single continuous coil are physically connected through the connection points.

20. The antenna of claim 13, wherein the first and second substrates are placed side-by-side and the first coil and second coil are connected to form a horizontal current path between the single continuous coils of the first substrate and the second substrate.

21. The antenna of claim 13, wherein the first and second substrates are placed top-down and the first coil and second coil are connected to form a vertical current path between the first coil and the second coil.

22. The antenna of claim 1, further comprising:
   a second substrate; and
   a single continuous coil wound on the second substrate to form an overlapping pattern substantially the same as the overlapping pattern of the three circular, single turn loops of the single continuous coil of the first substrate;
   wherein the single continuous coil of the first substrate and the single continuous coil of the second substrate are connected in parallel.

23. The antenna of claim 22, further comprising a capacitor coupled, and disposed between, the single continuous coil of the first substrate and the single continuous coil of the second substrate.

24. The antenna of claim 22, wherein the pattern of the single continuous coil of the first substrate and the pattern of the single continuous coil of the second substrate overlap.

25. The antenna of claim 22, wherein the first substrate further comprises a recess to pocket a capacitor.

26. The antenna of claim 1, wherein the single coil comprises at least two strands of parallel coils.

\* \* \* \* \*